United States Patent
Ostromek et al.

(10) Patent No.: US 7,373,023 B2
(45) Date of Patent: May 13, 2008

(54) METHOD AND SYSTEM FOR GENERATING AN IMAGE

(75) Inventors: Timothy E. Ostromek, Richardson, TX (US); Antonio V. Bacarella, Dallas, TX (US)

(73) Assignee: Northrop Grumman Guidance and Electronics Company, Inc., Linthicum, MD (US)

( * ) Notice: Subject to any disclaimer, the term of this patent is extended or adjusted under 35 U.S.C. 154(b) by 929 days.

(21) Appl. No.: 10/706,705

(22) Filed: Nov. 12, 2003

(65) Prior Publication Data

US 2005/0099435 A1 May 12, 2005

(51) Int. Cl.
*G06K 9/00* (2006.01)

(52) U.S. Cl. ............... 382/318; 382/312; 382/321; 382/236; 345/643; 345/644

(58) Field of Classification Search ........... 382/312, 382/318, 321, 236; 345/643, 644, 629, 819, 345/418
See application file for complete search history.

(56) References Cited

U.S. PATENT DOCUMENTS

| | | | |
|---|---|---|---|
| 4,669,812 A | 6/1987 | Hoebing | 359/9 |
| 5,005,147 A | 4/1991 | Krishen et al. | 703/13 |
| 5,113,493 A * | 5/1992 | Crosby | 345/473 |
| 6,014,181 A * | 1/2000 | Sun | 348/699 |
| 6,064,353 A | 5/2000 | Hoshi | 345/7 |
| 6,097,450 A | 8/2000 | Humphrey | 349/13 |
| 6,977,961 B1 * | 12/2005 | Eryurtlu | 375/240.02 |
| 2002/0150304 A1 | 10/2002 | Ockman | |
| 2003/0133604 A1 * | 7/2003 | Neumann | 382/149 |
| 2007/0019856 A1 * | 1/2007 | Furman et al. | 382/141 |

FOREIGN PATENT DOCUMENTS

WO  WO 01/84828 A1  11/2001
WO  WO 03/084216 A1  10/2003

* cited by examiner

*Primary Examiner*—Matthew C. Bella
*Assistant Examiner*—Ali A.B Bayat
(74) *Attorney, Agent, or Firm*—Fulbright & Jaworski LLP

(57) ABSTRACT

Generating an image includes receiving a light at sensors, where the light is associated with images. A previous matrix is determined, where the previous matrix includes image information associated with an image. For each sensor, a current image data corresponding to a current image is generated and a current matrix is determined using the previous matrix and the current image data. The current matrix includes image information associated with the current image. A fusion matrix is computed according to the current matrix of each sensor, where the fusion matrix initiates generation of a fused image.

20 Claims, 2 Drawing Sheets

METHOD AND SYSTEM FOR GENERATING AN IMAGE

TECHNICAL FIELD OF THE INVENTION

This invention relates generally to the field of electro-optical devices and more specifically to a method and system for generating an image.

BACKGROUND OF THE INVENTION

An optical sensor typically generates image information representing a sensed image. The image information may be analyzed by one or more image processors to generate at least a portion of the sensed image. A known technique for processing the image information may be performed by calculating and processing a matrix. Processing a matrix according to the known technique, however, consumes processing power, which may affect the battery life of a portable device. Additionally, memory may be required to store matrix information for the processed matrix, which may impact the cost and size of portable optical devices. Consequently, known techniques for processing image information may be unsatisfactory in certain situations.

SUMMARY OF THE INVENTION

In accordance with the present invention, disadvantages and problems associated with previous techniques for generating an image may be reduced or eliminated.

According to one embodiment, generating an image includes receiving a light at sensors, where the light is associated with images. A previous matrix is determined, where the previous matrix includes image information associated with an image. For each sensor, a current image data set corresponding to a current image is generated and a current matrix is determined using the previous matrix and the current image data. The current matrix includes image information associated with the current image. A fusion matrix is computed according to the current matrix of each sensor, where the fusion matrix initiates generation of a fused image.

Certain embodiments of the invention may provide one or more technical advantages. A technical advantage of one embodiment may be that matrix computations may be reduced, resulting in lower power consumption and less memory usage. Another technical advantage of one embodiment may be that by calculating only the changes in the image from frame to frame, more efficient processing is performed, resulting in higher speed and, therefore, better resolution. Yet another technical advantage of one embodiment may be that by using hardware architecture to perform the matrix calculations and image analysis, overhead processing capabilities of a microprocessor may be avoided, resulting in faster processing at lower clock speeds. Yet another technical advantage of one embodiment may be that by reducing power and memory consumption, an image generation device may be more effective as a portable unit, especially in remote areas where recharging batteries may be impractical.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
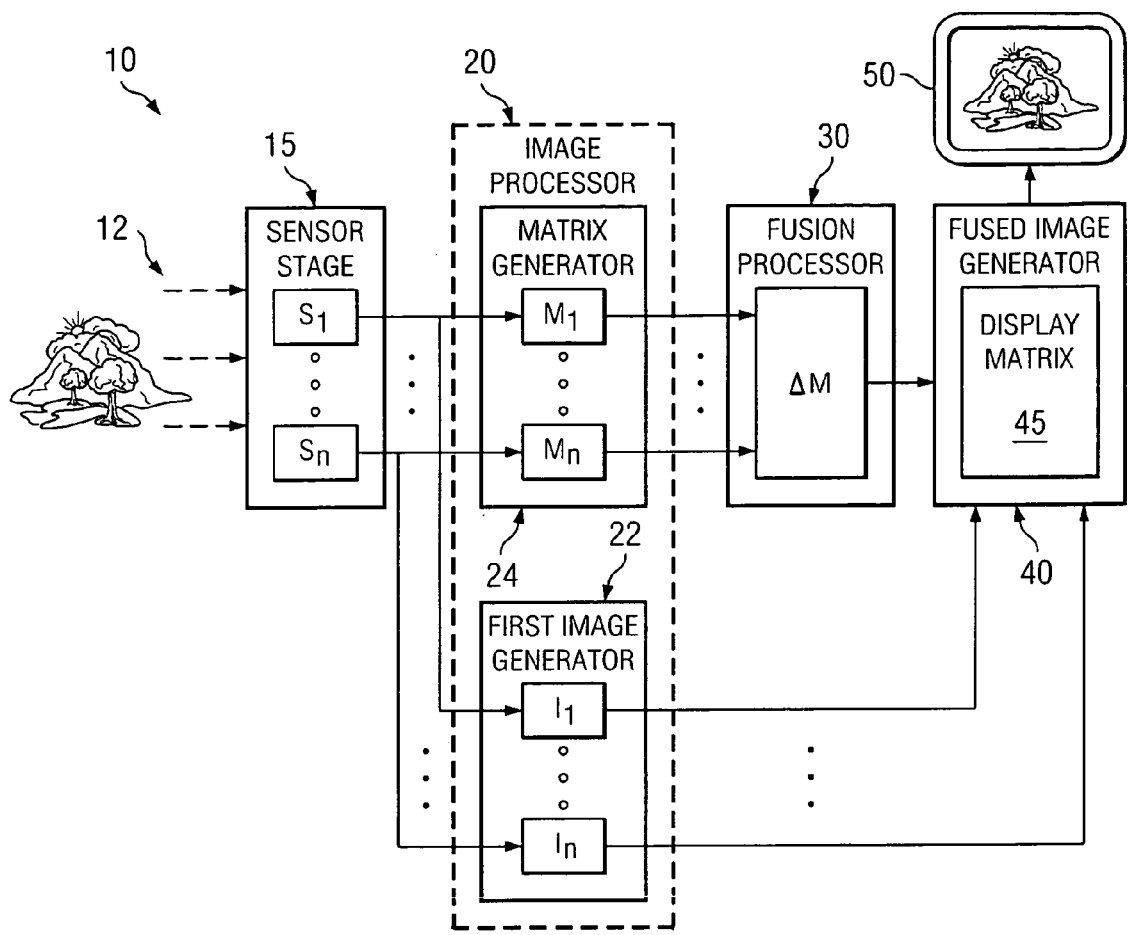
FIG. 1 is a block diagram of one embodiment of an image generation system that may be used in accordance with the present invention.
Figure 2:
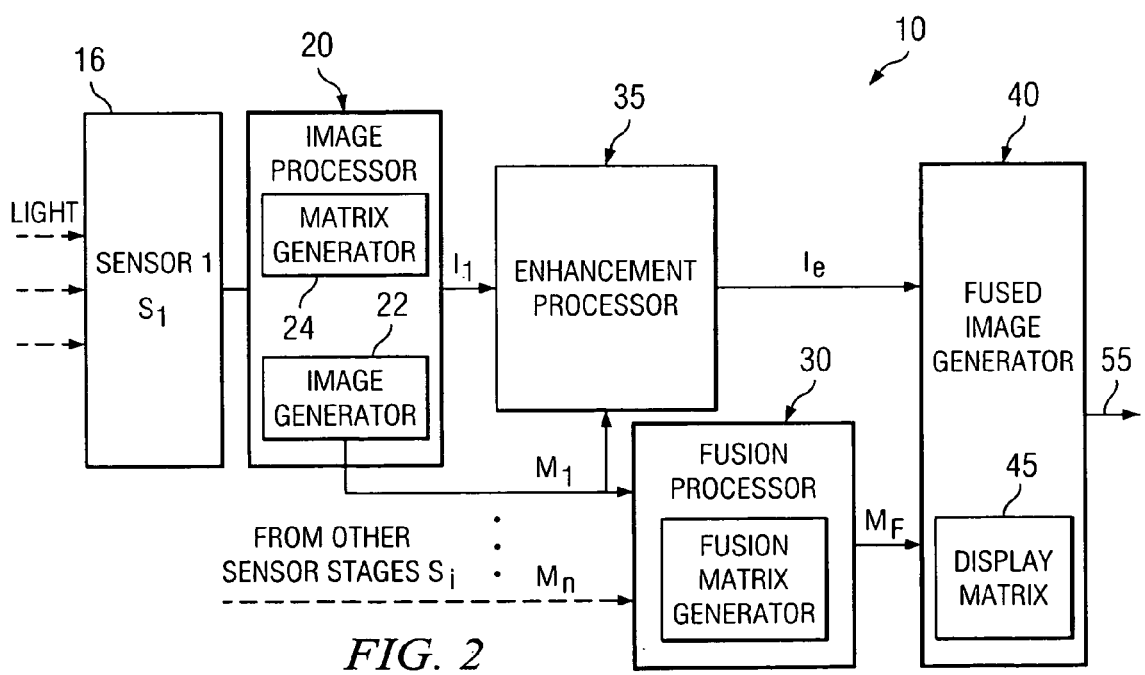
FIG. 2 is a block diagram of another embodiment of an image generation system that may be used in accordance with the present invention.
Figure 3:
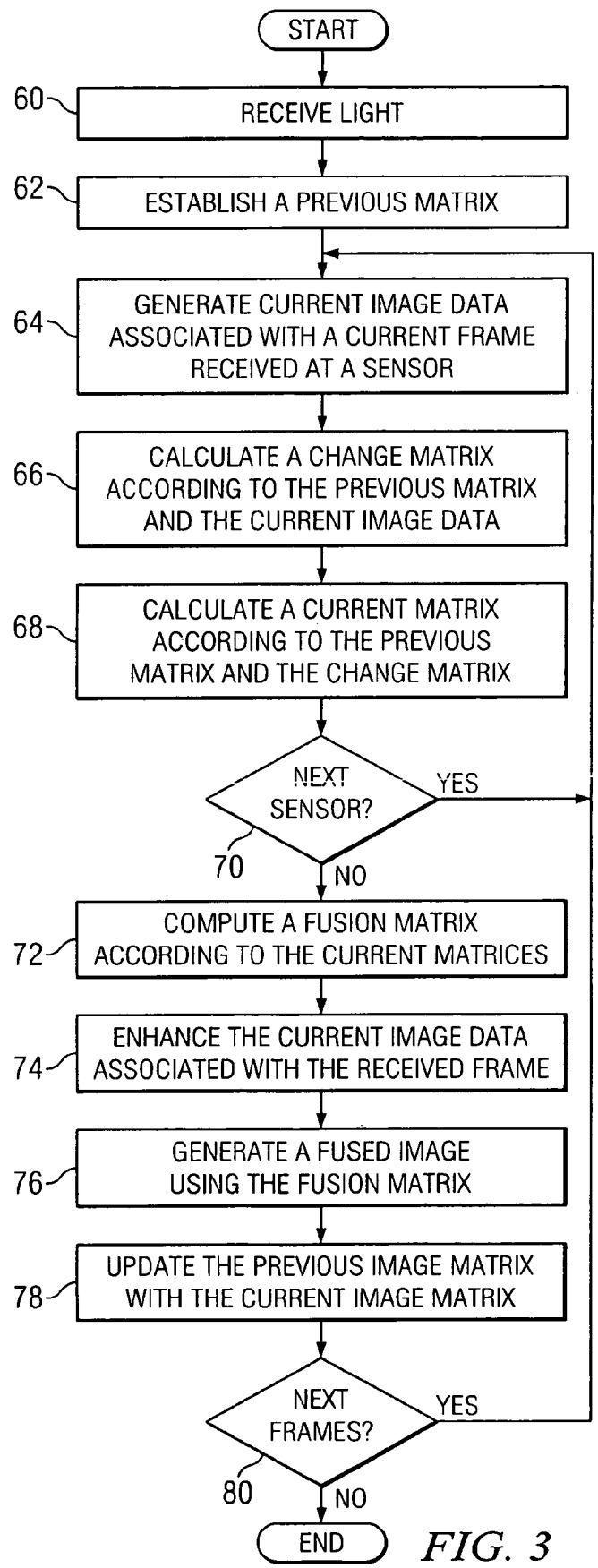
FIG. 3 is a flowchart demonstrating one embodiment of a method for generating an image that may be used in accordance with the present invention.

Embodiments of the present invention and its advantages are best understood by referring to FIGS. 1 through 3 of the drawings, like numerals being used for like and corresponding parts of the various drawings.

FIG. 1 is a block diagram of one embodiment of an image generation system 10 that may be used in accordance with the present invention. In general, system 10 may generate an image by determining a plurality of matrices that may be fused together to generate an image. An image processor 20 includes a matrix generator 24 that generates a matrix for each image received at each sensor of system 10 by detecting changes in the image from frame to frame, which may potentially reduce the processing workload of image processor 20.

In operation, a sensor stage 15 includes a plurality of sensors that receive light 12 associated with a plurality of images. Image processor 20 determines a matrix for the light received at each sensor. A fusion processor 30 fuses the matrices to compute a fusion matrix that may be used by a fused image generator 40 to initiate the generation of a fused image. According to the illustrated embodiment, system 10 includes sensor stage 15, image processor 20, fusion processor 30, fused image generator 40, and a display 50 coupled as shown in FIG. 1.

Sensor stage 15 includes a plurality of sensors $S_1, \ldots, S_n, \ldots, S_p$, where each sensor is operable to receive light 12. Sensor stage 15 may include any number of sensors $S_1, \ldots, S_p$ that perform any suitable sensing without departing from the scope of the invention. For example, sensor stage 15 may include three sensors, $S_1$, $S_2$, and $S_3$, each sensor sensing light 12 at different wavelengths, $\lambda_1, \lambda_2, \lambda_3$. In that embodiment, system 10 may be used to generate a color image based on the information received at sensors $S_1$ through $S_3$ if each sensor filters light 12 of wavelengths corresponding to the colors red, blue, and green. Sensors $S_1, \ldots, S_p$ may comprise cameras, infrared receivers, image intensifier devices, or any other suitable light sensing device. Sensors $S_1, \ldots, S_p$ may also filter any range of wavelengths without departing from the scope of the invention.

Sensor stage 15 analyzes the sensed light 12 to yield raw image data. According to the illustrated embodiment, each sensor $S_n$ analyzes sensed light 12 according to its filtering characteristics and outputs raw image data $i_n$, where n represents the corresponding sensor. For example, a first sensor $S_1$ analyzes light 12 to generate raw image data $i_1$, while a second sensor $S_2$ analyzes light 12 to generate raw image data $i_2$. Sensor $S_n$ may generate raw image data $i_1$ in any suitable format, such as in analog or digital format, or in any other suitable format without departing from the scope of the invention. According to one embodiment, each sensor $S_n$ generates raw image data $i_n$ as a stream of bits, packetized and/or encapsulated data, binary or otherwise, or in any other suitable format and at any suitable rate.

Image processor 20 analyzes the raw image data $i_n$ received from sensor stage 15 to determine enhancements to the image and to prepare the image for fusion. According to the illustrated embodiment, image processor 20 includes an image data generator 22 and a matrix generator 24.

Image data generator 22 receives the raw image data $i_n$ from sensor stage 15 and generates image information. The image information may be used by matrix generator 24 to generate a matrix for each sensed image. According to the illustrated embodiment, image data generator 22 generates image information $I_n$, where n represents the corresponding sensor. Image information $I_n$ may include any data corresponding to the sensed image, such as raw data, functions, numbers, arrays, or any other suitable representation of image data.

Image data $I_n$ may be received at any port, buffer, cache, memory, storage area, or any other suitable module of image data generator 22 of image processor 20. In one embodiment, image information $I_n$ may be buffered at a rate of a specific number of lines of data at a time, such as two lines of data per millisecond. Any other suitable buffering technique using any suitable rate may be used at image data generator 22 without departing from the scope of the invention.

Matrix generator 24 determines a matrix $M_n$ for each sensed image. The matrix $M_n$ quantifies the image information using algorithms, operations, or functions that may be used to represent the image. Matrices $M_1, \ldots, M_p$ may perform the algorithms, operations, or functions using the corresponding image information $T_1, \ldots, I_p$ to completely describe the image sensed by the corresponding sensor $S_1, \ldots, S_p$. Matrices $M_1, \ldots, M_p$ may include, however, any other quantification or characterization of an image representation without departing from the scope of the invention. For example, matrix $M_n$ may quantify key features of an image, and may include target identifiers describing portions of the image that are targets; functions, operations, or algorithms representing gradients or variances of the spatial frequencies of the image; histograms providing information about light and dark areas of the image; or any other suitable manner of describing features of an image that may be of interest.

According to the illustrated embodiment, matrix generator 24 calculates a current matrix $M_n^i$, where n represents the corresponding sensor, and i represents the current image frame $F_i$. According to one embodiment, current matrix $M_n^i$ is calculated by determining the changes in the image from frame to frame. For example, at frame $F_1$ for the image sensed by sensor $S_1$, matrix generator 24 determines a current matrix $M_1^i$. At a subsequent frame $F_2$, matrix generator 24 determines the changes in the images between frame $F_1$ and frame $F_2$ by analyzing the current image information $I_1$ generated by sensor $S_1$ and extracting the changes between the analyzed current image information $I_1$ and the previous image characterized by a previous matrix $M_1^{(i-1)}$.

Image processor 20 may compute a change in the image using image information $I_n$ and matrices $M_1, \ldots, M_n$. According to the illustrated embodiment, image processor 20 may calculate a change matrix $\Delta M_n$ indicating a change in the image according to the previous matrix $M_n^{(i-1)}$ and the current image information $I_n$. Using the change matrix $\Delta M_n$, image processor 20 may approximate the current matrix $M_n^i$ by adjusting the previous matrix $M_n^{(i-1)}$ according to the change matrix $\Delta M_n$.

Fusion processor 30 generates a fusion matrix representing an enhanced image. According to the illustrated embodiment, fusion matrix $M_f$ may comprise a matrix comprising numbers, functions, operations, algorithms, or any other suitable representation of the fusion of a plurality of matrices. According to one embodiment, fusion processor 30 receives and analyzes current matrices $M_1^i, \ldots, M_n^i$ to determine image enhancements that may be performed to the image before displaying the image. Fusion processor 30 may use any suitable fusion technique to generate fusion matrix $M_f$ without departing from the scope of the invention.

Fused image generator 40 may process fusion matrix $M_f$ and generate a display matrix 45. Display matrix 45 uses the fusion matrix $M_f$ and the current image information $I_1, \ldots, I_n$ to initiate the generation of a fused image at display 50. According to the illustrated embodiment, fused image generator 40 implements the approximations of the current matrices $M_1^i, \ldots, M_n^i$ fused at matrix $M_f$ using the image information $I_1, \ldots, I_n$ to generate a display matrix 45.

According to one embodiment, fused image generator 40 may generate display matrix 45, any fused image, or data representing an image for displaying at display 50 so that a human eye can perceive an image that at least in part represents at least a portion of the image associated with light 12. For example, fused image generator 40 may initiate the generation of the image by processing display matrix 45 so that at least thirty frames per second are displayed at display 50. Any other suitable rate of processing may be used at fused image generator 40 without departing from the scope of the invention. For example, fused image generator 40 may process display matrix 45 at the rate of sixty frames per second.

Display 50 may include any output device suitable for displaying an image. According to one embodiment, display 50 may comprise a monitor, a screen, a projection surface, an x-ray tube, an anode screen, or a liquid crystal display (LCD), or any other device suitable for displaying an image.

Modifications, additions, or omissions may be made to system 10 without departing from the scope of the invention. For example, image processor 20 may be implemented using separate processors for the function of generating a matrix and the function of generating the image information. As another example, fused image generator 40 and display 50 may be modified so that display 50 comprises a processor or other logic operable to perform the functions of fused image generator 40. As used in this document, "each" refers to each member of a set or each member of a subset of a set.

Additionally, functions may be performed using any suitable logic comprising hardware, software, other logic, or any other suitable combination of the preceding. For example, although the term "processor" has been used to describe image processor 20, fusion processor 30, and fused image generator 40, any logic architecture may be used to perform the specific functions of each processor. According to the illustrated embodiment, image processor 20, fusion processor 30, and fused image generator 40 may comprise a field programmable gate array (FPGA), a neural net, logic operators, hardware architecture, solid state circuits, other real time gate devices, or any other suitable device that may be used to process the specific functions of image processor 20, fusion processor 30, and/or fused image generator 40. Any suitable number of logic devices may be used to perform the functions of the processors at system 10. For example, system 10 may employ hundreds or thousands of gates to generate an image using the functions performed by the processors at system 10. Accordingly, system 10 may generate an image using any hardware suitable for processing image information $I_1$-$I_n$, matrices $M_1$-$M_n$, fusion matrix $M_f$, and display matrix 45.

A known technique for processing the image information may be performed by calculating and processing a matrix for each frame of the sensed image. Processing a matrix for each frame, however, consumes processing power, which may affect the battery life of a portable device. Additionally, memory may be required to store matrix information for the entire processed matrix, which may impact the cost and size of portable optical devices. System 10 may provide an advantage over the known technique. Basing the architecture of system 10 on the above-mentioned hardware avoids the use of microprocessors, which may result in lower consumption of memory capacity and power. Reducing or eliminating the memory capacity used may also increase the processing speed at which system 10 generates an image, while maintaining power consumption to a minimum.

FIG. 2 is a block diagram of another embodiment of an image generation system 10 that may be used in accordance with the present invention. According to the illustrated embodiment, the system 10 illustrated at FIG. 2 includes an enhancement processor 35 that is coupled to image processor 20 and fused image generator 40 as shown. Sensor 16 as illustrated is part of sensor stage 15 described with reference to FIG. 1. Similarly, image processor 20, fusion processor 30, and fused image generator 40 are configured and operate as described with reference to FIG. 1.

Enhancement processor 35 may operate to enhance and condition components of matrices $M_1, \ldots, M_n$ to generate enhanced image information $I_e$. Enhancement processor 35 may process the enhancements prior to and separately from fusing the matrices at fusion processor 30. For example, enhancement processor 35 may receive matrix $M_1$ and image information $I_1$ to condition, enhance, or initiate the conditioning or enhancement of the image data represented by the image information $I_1$ and matrix $M_1$.

Additional enhancement processors 35 may be added to one or more image paths of system 10. For example, an additional enhancement processor 35 may be added at the image path from a sensor $S_2$ (not shown) so that image information $I_2$ and matrix $M_2$ may be processed in parallel to the processing of the image information $I_1$, and matrix $M_1$ corresponding to sensor $S_1$. Any suitable number of enhancement processors 35 may be added at system 10 without departing from the scope of the invention. Additionally, although the enhancement processing of the images has been described as occurring in parallel, any processing timing may be used by enhancement processor 35 to produce enhanced image $I_e$.

By enhancing an image at enhancement processor 35, fusion processor 30 may fuse the matrices $M_1, \ldots, M_n$ without performing enhancement of the image content. Separating the functions of enhancement and fusion may result in a more versatile circuit capable of enhancing the image prior to fusing the matrices, or otherwise, as long as enhanced image information $I_e$ and fusion matrix $M_f$ are received in parallel at the fused image generator 40.

Additionally, the image information $I_1, \ldots, I_n$ and the matrices $M_1, \ldots, M_n$ may be processed at a higher speed, which may be used if a high image resolution is desired. For example, enhancement processor 35 may be used to improve the quality of the fused image 55 if a display resolution of 1280×960 and higher is desired. Enhancement processor 35 may be used, however, regardless of the desired resolution. For example, enhancement processor 35 may be used to produce a resolution of 640×480 at a VGA display or any other suitable display.

Modifications, additions, or omissions may be made to system 10 without departing from the scope of the invention. For example, enhancement processor 35 may be included at image processor 20 to ensure that enhancement of an image is performed prior to fusing the images at fusion processor 30. As yet another example, a display 50 may be added at system 10 of FIG. 2 so that fused image 55 may be displayed.

Additionally, functions may be performed using any suitable logic comprising software, hardware, other logic, or any suitable combination of the preceding. For example, as was described with reference to FIG. 1, enhancement processor 35, although described as a processor, may be configured using the hardware logic described with reference to the processors of FIG. 1. Enhancement processor 35 may, however, be configured differently from the image processor 20, fusion processor 30, and fused image generator 40 described with reference to FIG. 1.

FIG. 3 is a flowchart demonstrating one embodiment of a method for generating an image that may be used in accordance with the present invention. The method begins at step 60 where sensors $S_1, \ldots, S_n$ at sensor stage 15 receive light 12. According to the illustrated embodiment, at least two sensors may be used at sensor stage 15 for system 10 to generate at least two representations of an image associated with light 12.

The method proceeds to step 62, where matrix generator 24 establishes a previous matrix. According to the illustrated embodiment, a previous matrix may be established using the image information that may be received from image data generator 22 and/or sensor stage 15. Any other initialization matrix may be used by matrix generator 24 to establish a previous matrix without departing from the scope of the invention. At step 64, image data generator 22 generates current image data associated with a current frame received at a sensor. For example, image data generator 22 may generate image information Ii associated with a frame $F_1$ received at sensor $S_1$.

Matrix generator 24 calculates a change matrix according to the previous matrix and the current image data at step 66. As was described with reference to FIG. 1, a change matrix $\Delta M_n$ representing the changes in the image may be used to calculate a current matrix $M_n^i$, and may be calculated by extracting the differences between the current image data $I_n$ and the previous matrix $M_n^{(i-1)}$. The change matrix $\Delta M_n$ may be calculated according to Equation (1):

$$\Delta M_n = I_n - M_n^{(i-1)} \qquad (1)$$

Matrix generator 24 calculates a current matrix according to the previous matrix and the change matrix, at step 68. A current matrix $M_n^i$ may be described by Equation (2):

$$M_n^{(i)} = M_n^{(i-1)} + \Delta M_n \qquad (2)$$

As was described with reference to FIG. 1, a matrix $M_n^i$ for the current frame i may be calculated by analyzing the image information $I_1$ to determine how to condition the image so that enhancements may be performed to the previous matrix. According to one embodiment, matrix generator 24 analyzes image information $I_n$ by extracting functions that may be performed on the image data to condition image characteristics such as spurious portions of an image, weak portions of an image, contrast aspects of an image, brightness, sharpening, dulling, or any other suitable image characteristic suitable for enhancement by image processor 20.

At step 70 the method determines if a next sensor is available at system 10. If there is a next sensor, the method returns to step 64, where the image data generator 22 of image processor 20 generates a current image data $I_n$ associated with a current frame received at the next sensor $S_2$.

If there is no next sensor at step 70, the method proceeds to step 72, where fusion processor 30 computes a fusion matrix $M_f$ according to the current matrices $M_1^i, \ldots, M_n^i$. According to one embodiment, the fusion matrix $M_f$ may be generated by fusing at least two running frames of data included in current matrices $M_1^i, \ldots, M_n^i$.

Enhancement processor 35 may enhance the current image data associated with the received frame at step 74. For example, as was described with reference to FIG. 2, enhancement processor 35 may enhance, condition, or initiate the conditioning or enhancement of the image data to produce enhanced image information $I_e$.

At step 76, fused image generator 40 generates a fused image 55 using the fusion matrix $M_f$. According to one embodiment, fused image generator 40 may receive enhanced image $I_e$ and fusion matrix $M_f$ to generate a display matrix 45 that may be used to generate fused image 55. According to another embodiment, fused image generator 40 may receive fused matrix $M_f$ and image information $I_1, \ldots, I_n$ to generate a display matrix 45. Fused image generator 40 generates display matrix 45 using the functions included in fused matrix $M_f$ applied to the image information $I_1, \ldots, I_n$.

Image processor 20 updates the previous image matrix with the current image matrix at step 78. The method determines if there are next frames to be processed at step 80. If there are frames to be processed, the method returns to step 74 to generate a current image data associated with a current frame received at a sensor. If there are no next frames to process, the method terminates.

Modifications, additions, or omissions may be made to the method without departing from the scope of the invention. For example, enhancing the current image data associated with a received frame at step 74 may be omitted if an enhancement processor 35 is not used at system 10. As another example, a step may be added after enhancing the current image data at step 74, where a display matrix 45 is generated at fused image generator 40. Additionally, steps may be performed in any suitable order without departing from the scope of the invention. For example, calculating a current matrix according to the previous matrix and the current image data at step 66 may be performed substantially simultaneously. As another example, determining if a next sensor is to be processed at step 70 may be omitted so that the steps of generating a current image data at step 64, calculating a current matrix at step 66, and calculating a change matrix at step 68 are performed substantially in parallel for each sensor $S_n$ at sensor stage 15. As yet another example, computing a fusion matrix according to the current matrices at step 72 may be performed substantially simultaneously with enhancing the current image data associated with a received frame at step 74.

Certain embodiments of the invention may provide one or more technical advantages. A technical advantage of one embodiment may be that matrix computations may be reduced, resulting in lower power consumption and less memory usage. Another technical advantage of one embodiment may be that by calculating only the changes in the image from frame to frame, more efficient processing is performed, resulting in higher speed and, therefore, better resolution. Yet another technical advantage of one embodiment may be that by using hardware architecture to perform the matrix calculations and image analysis, overhead processing capabilities of a microprocessor may be avoided, resulting in faster processing at lower clock speeds. Yet another technical advantage of one embodiment may be that by reducing power and memory consumption, an image generation device may be more effective as a portable unit, especially in remote areas where recharging batteries may be impractical.

Although an embodiment of the invention and its advantages are described in detail, a person skilled in the art could make various alterations, additions, and omissions without departing from the spirit and scope of the present invention as defined by the appended claims.

What is claimed is:

1. A method for generating an image, comprising:
   receiving light at a plurality of sensors, the light associated with a plurality of images;
   repeating the following for each sensor of the plurality of sensors:
      determining a previous matrix comprising image information associated with a previous image of the plurality of images;
      generating current image data corresponding to a current image of the plurality of images; and
      determining a current matrix using the previous matrix and the current image data, the current matrix comprising image information associated with the current image; and
   computing a fusion matrix by fusing the current matrix of each sensor of the plurality of sensors, the fusion matrix operable to initiate generation of a fused image.

2. The method of claim 1, wherein determining a current matrix further comprises calculating a change matrix indicating a change associated with the previous matrix and the current image data.

3. The method of claim 1, wherein determining the current matrix further comprises determining a difference between the current image data and the previous matrix.

4. The method of claim 1, wherein computing the fusion matrix further comprises computing the fusion matrix only if a change matrix indicates a change associated with a previous matrix and a current matrix.

5. The method of claim 1, wherein computing the fusion matrix further comprises computing the fusion matrix at a fusion processor, the fusion processor comprising a member of the group consisting of a neural net, a plurality of logic operators, a field programmable gate array (FPGA), one or more solid state circuits, and a hardware architecture.

6. The method of claim 1, further comprising generating a display matrix according to the fusion matrix, the display matrix operable to generate the fused image.

7. The method of claim 1, further comprising displaying the fused image generated in accordance with the fusion matrix.

8. The method of claim 1, further comprising processing each current matrix to enhance one or more components of each current matrix.

9. The method of claim 1, wherein each sensor of the plurality of sensors is associated with a different wavelength range.

10. A system for generating an image, comprising:
   a plurality of sensors operable to receive a light the tight associated with a plurality of images; and
   a processor coupled to the plurality of sensors and operable to:
      repeat the following for each sensor of the plurality of sensors:
         determine a previous matrix comprising image information associated with a previous image of the plurality of images;

generate current image data corresponding to a current image of the plurality of images; and determine a current matrix using the previous matrix and the current image data, the current matrix comprising image information associated with the current image; and compute a fusion matrix by fusing the current matrix of each sensor of the plurality of sensors, the fusion matrix operable to initiate generation of a fused image.

11. The system of claim 10, the processor further operable to calculate a change matrix indicating a change associated with the previous matrix and the current image data.

12. The system of claim 10, the processor further operable to determine a difference between the current image data and the previous matrix.

13. The system of claim 10, the processor further operable to compute the fusion matrix only if a change matrix indicates a change associated with a previous matrix and a current matrix.

14. The system of claim 10, the processor further operable to compute the fusion matrix at a fusion processor, the fusion processor comprising a member of the group consisting of a neural net, a plurality of logic operators, a field programmable gate array (FPGA), one or mote solid state circuits, and a hardware architecture.

15. The system of claim 10, the processor further operable to generate a display matrix according to the fusion matrix, the display matrix operable to generate the fused image.

16. The system of claim 10, further comprising a display coupled to the processor and operable to display the fused image generated in accordance with the fusion matrix.

17. The system of claim 10, the processor further operable to process each current matrix to enhance one or more components of each current matrix.

18. The system of claim 10, wherein each sensor of the plurality of sensors is associated with a different wavelength range.

19. A system for generating an image, comprising:
means for receiving light at a plurality of sensors, the light associated with a plurality of images;
means for repeating the following for each sensor of the plurality of sensors:
  determining a previous matrix comprising image information associated with a previous image of the plurality of images;
  generating current image data corresponding to a current image of the plurality of images; and
  determining a current matrix using the previous matrix and the current image data, the current matrix comprising image information associated with the current image; and
means for computing a fusion matrix by fusing the current matrix of each sensor of the plurality of sensors, the fusion matrix operable to initiate generation of a fused image.

20. A method for generating an image, comprising:
receiving a light at a plurality of sensors, the light associated with a plurality of images, each sensor of the plurality of sensors being associated with a particular wavelength range;
repeating the following for each sensor of the plurality of sensors:
  determining a previous matrix comprising image information associated with a previous image of the plurality of images;
  generating current image data corresponding to a current image of the plurality of images;
  determining a current matrix using the previous matrix and the current image data, the current matrix comprising image information associated with the current image, the current matrix determined by:
    determining a difference between the current image data and the previous matrix; and
    calculating a change matrix using the difference; and
  processing each current matrix to enhance once or more components of each current matrix;
computing a fusion matrix by fusing the current matrix of each sensor of the plurality of sensors by:
  computing the fusion matrix only if any change matrix indicates a change associated with a previous matrix and a current matrix; and
  computing the fusion matrix at a fusion processor, the fusion processor comprising a member of the group consisting of a neural net, a plurality of logic operators, a field programmable gate array (FPGA), solid state circuits, and a hardware architecture, the fusion matrix operable to initiate generation of a fused image;
generating a display matrix according to the fusion matrix, the display matrix operable to generate the fused image; and
displaying the fused image generated in accordance with the fusion matrix.

* * * * *